C. E. BONINE.
PROCESS OF STERILIZING MILK.
APPLICATION FILED DEC. 17, 1912.
1,081,483.
Patented Dec. 16, 1913.
4 SHEETS—SHEET 2.
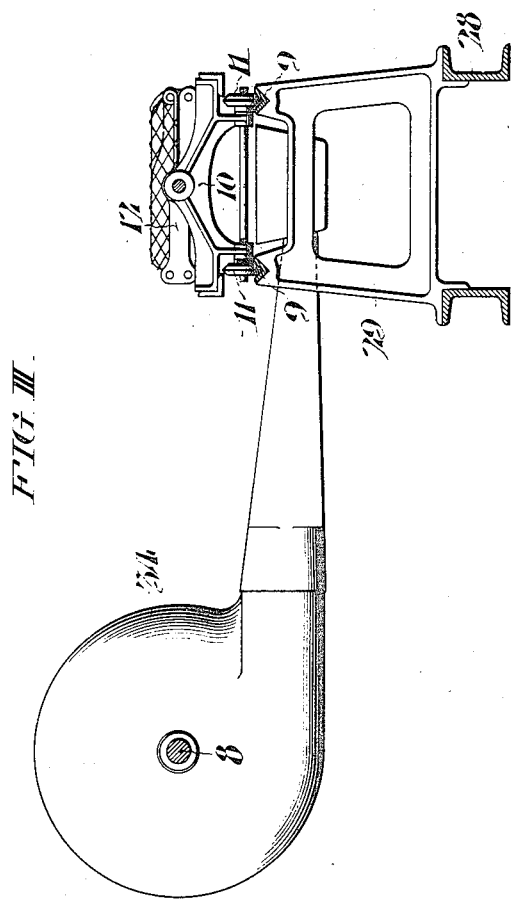
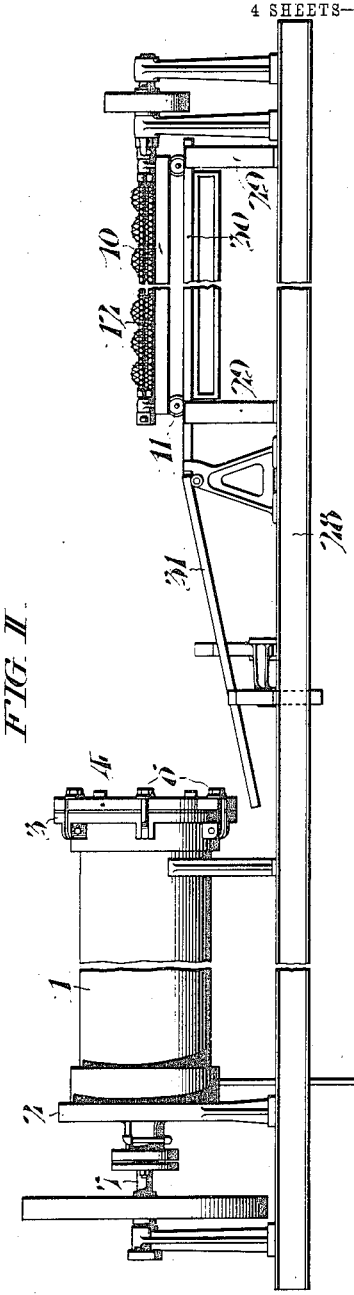
Inventor
Charles E. Bonine,
Witnesses

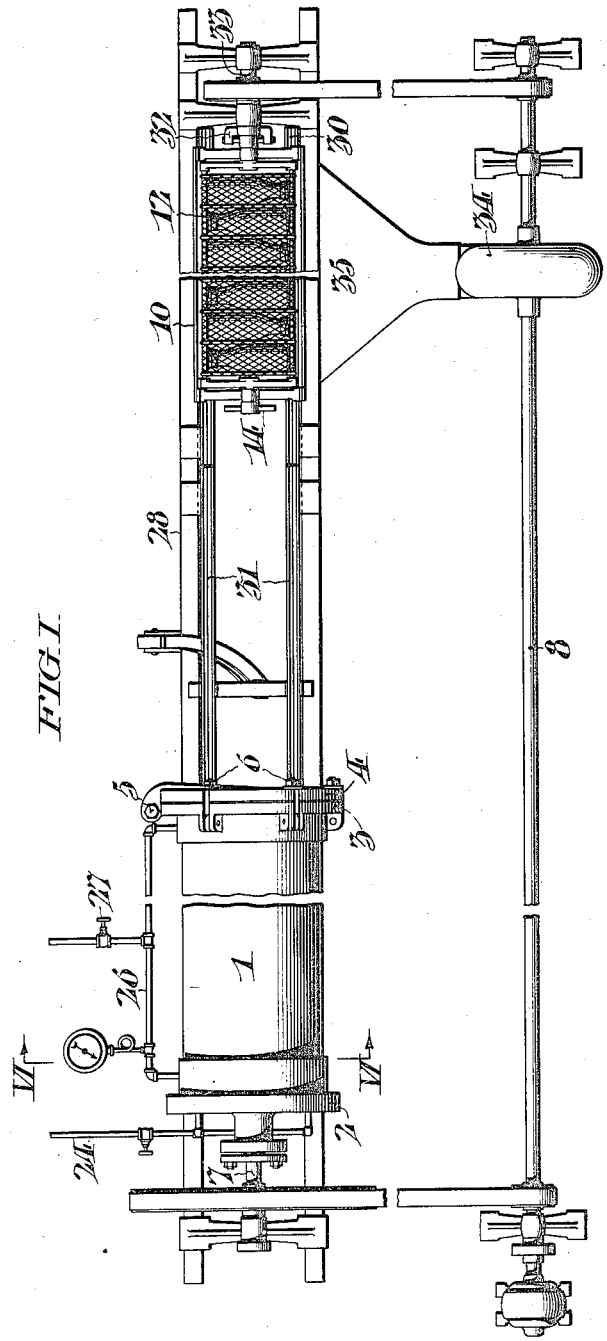

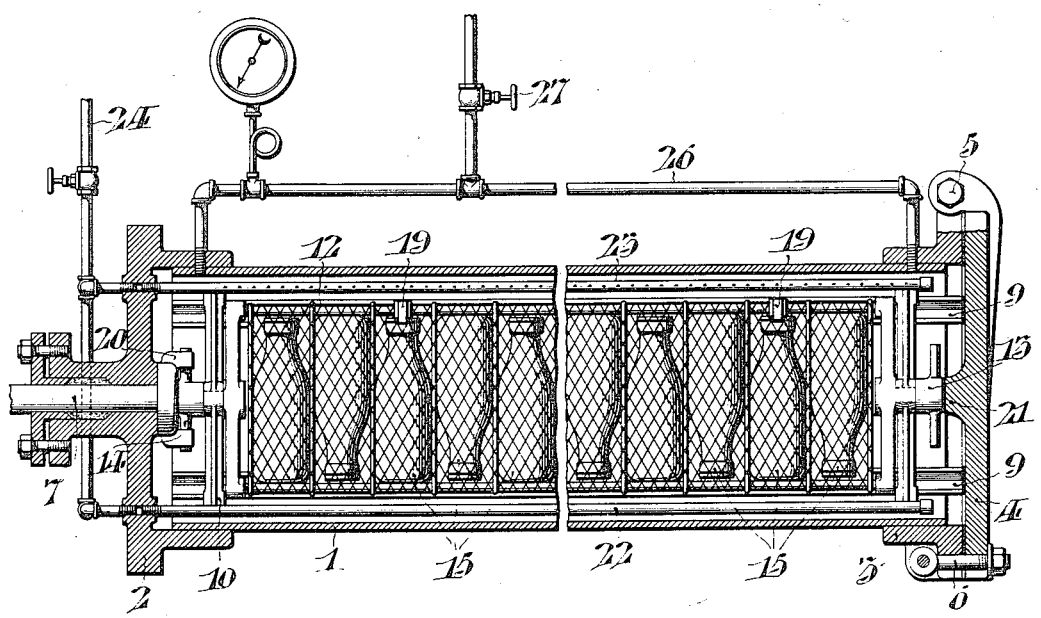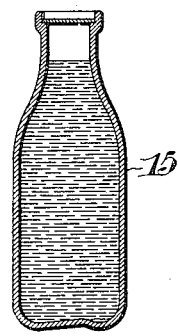

C. E. BONINE.
PROCESS OF STERILIZING MILK.
APPLICATION FILED DEC. 17, 1912.
1,081,483.
Patented Dec. 16, 1913.
4 SHEETS—SHEET 4.
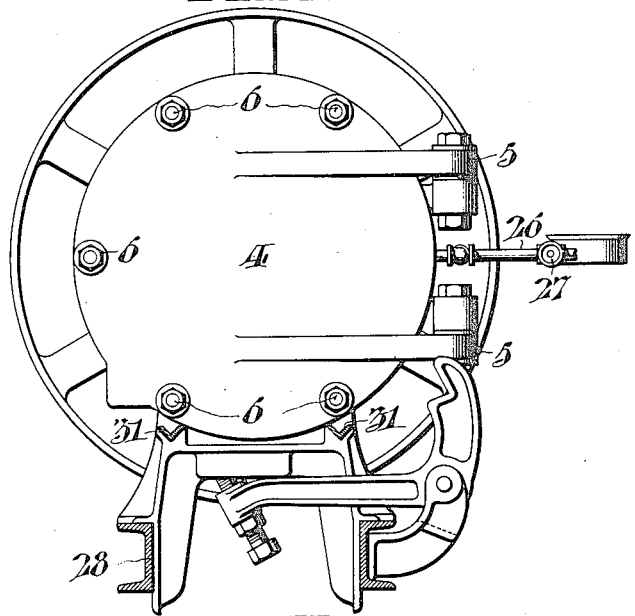
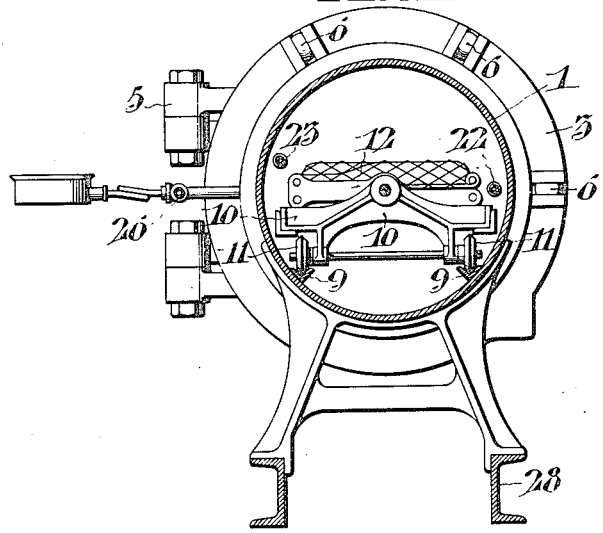
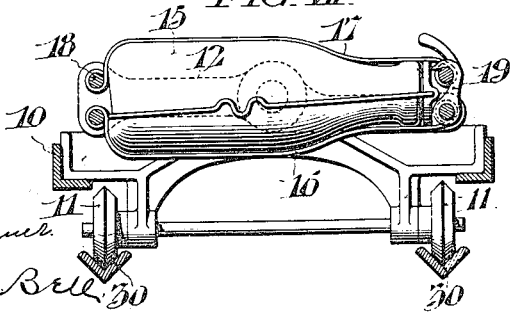
Inventor
Charles E. Bonine,

UNITED STATES PATENT OFFICE.

CHARLES E. BONINE, OF PHILADELPHIA, PENNSYLVANIA.

PROCESS OF STERILIZING MILK.

1,081,483.  Specification of Letters Patent.  Patented Dec. 16, 1913.

Application filed December 17, 1912.  Serial No. 737,195.

*To all whom it may concern:*

Be it known that I, CHARLES E. BONINE, of Philadelphia, in the county of Philadelphia and State of Pennsylvania, have invented certain new and useful Improvements in Processes of Sterilizing Milk, whereof the following is a specification, reference being had to the accompanying drawings.

It is well known that the taste and odor of milk are due, in a large measure, to the dissolved gases contained therein. Processes, as now practised, for sterilizing milk result in the separation of these gases from the milk which imparts thereto a boiled taste and a peculiar odor, both of which are objectionable to the consumer.

An object of the present invention is to provide a process whereby milk may be thoroughly sterilized without this resulting separation of the gases contained therein from the milk, and whereby the desired taste and odor of the milk are maintained.

A further object of the invention is to provide a process wherein the milk may be sterilized in the containers in which it is to be handled, or stored, which process prevents a separation of the gases from the milk, either during sterilizing or during the subsequent cooling of the milk.

These and other objects will in part be obvious, and will in part be hereinafter more fully disclosed.

In the drawings, which show one form of apparatus for carrying out my improved process, Figure I, is a plan view showing an apparatus wherein the milk may be placed in separate containers and sterilized by my improved process and subsequently cooled. Fig. II, is a side view of the same, the operating shaft and the blower being omitted. Fig. III, is a transverse sectional view showing the apparatus for cooling the containers in end view. Fig. IV, is a longitudinal horizontal sectional view through the sterilizing chamber. Fig. V, is an end view of the sterilizing chamber. Fig. VI, is a sectional view on the line VI, VI, of Fig. I. Fig. VII, is an enlarged sectional view showing one of the containers and the supporting frame therefor. Fig. VIII, is a view showing one of the containers filled with milk, in accordance with my invention.

The process consists generally of heating the milk to a temperature somewhat in excess of 100° C., long enough to destroy the bacteria, or to a higher temperature, approximately 130° C., until the spores are destroyed, and the maintaining of a surface pressure on the milk during the entire sterilizing of the same, which exceeds the vapor pressure of the milk, whereby the gases contained in the milk are prevented from separating therefrom. According to my process this surface pressure on the milk is secured by placing the milk in closed containers in which the milk is heated to sterilizing temperature and subsequently cooled. During the heating of the container and the contents, there occurs an expansion of the milk and the dissolved gases, an expansion of the air in the container over the milk, and also an expansion of the material forming the container, that is the volume of the container. If the volume of air in the container be rightly proportioned, the resulting pressure of the air on the surface of the milk will exceed the vapor pressure of the milk. I have found in practice that when the container is filled at about 20° C. and at atmospheric pressure, it should be filled to from 85% to 92% of its full capacity. The amount of milk placed in the container varies with the material of the container.

Referring to the apparatus shown in the drawings, the process will be described in further detail, it being understood, however, that the present apparatus is described purely for the purpose of a better understanding of the process set forth in the appended claims, and in no wise restricts or limits the scope of my invention.

In Fig. I, of the drawings, I have shown a sterilizing apparatus consisting of a sterilizing chamber 1, which is preferably cylindrical in shape. This sterilizing chamber is formed with a head 2, which is fixed thereon, and a head 3, similarly secured to the sterilizing chamber, and having a door 4, hinged at 5, to the head, so that the sterilizing chamber may be readily opened or closed. This door 4, is sealed when it is closed and is held closed by locking bolts 6, of the usual construction. A shaft 7, extends through the head 2, into the sterilizing chamber. This shaft is rotated from the main driving shaft 8, which may be operated from any suitable source of power.

Inside of the sterilizing chamber are two V-shaped tracks 9, 9, on which is adapted to roll a carriage 10, mounted on suitable wheels 11. This carriage consists of a suitable frame on which the wheels 11, 11, are mounted, and carried on the frame is a tray 12, which is pivoted to the supporting frame of the carriage. These pivotal supports are in the form of trunnions, which extend through their bearings and each is provided with a cross-arm 14. This tray for the containers is so proportioned that it may rotate in the carriage in the supporting bearings therefor. The containers 15, as herein shown, are of glass, and of the usual form. The containers are adapted to be placed on their sides in suitable wire pockets 16, formed therefor, and are held in place by a similar wire cover 17, which is hinged at one side, as at 18, and is held closed on the containers by suitable latches 19. (See Fig. VII.) When the containers are placed in the tray formed therefor, as above noted, and the wire cover closed on the same, they may be rotated with the tray.

The shaft 7, which extends into the sterilizing chamber, is formed with a forked clutch 20. When the carriage is rolled into the sterilizing chamber, the cross-arms 14, are caused to engage the clutch 20. The door 4, is formed with an abutment 21, which lies adjacent the opposite trunnion 13, of the carriage, and holds the cross-arms 14, in the clutch 20. By the rotating of the shaft 7, the tray holding the containers will be rotated in the carriage.

The sterilizing chamber, as herein shown, is heated by steam pipes 22, and 23, which extend lengthwise of the chamber. The pipe 23, is formed with openings on its upper face, which are directed so that when steam is admitted to the pipe, the jets are directed slightly outwardly toward the inner wall of the sterilizing chamber and away from the container held on the tray. The steam pipe 22, is formed with openings in the lower face thereof, which are directed so that the jets of steam issuing therefrom will be directed against the inner wall of the sterilizing chamber and away from the containers. Steam is admitted to the pipes 22, and 23, from a pipe 24, having a controlling valve 25, therein. The steam may be exhausted from the chamber through a pipe 26, connecting with each end thereof, and the pressure in the chamber may be controlled by a hand valve 27.

The container is closed by the usual form of cap, which may be held thereon in any desired way. As herein shown a retaining bail is used which clamps the cap to the container. Other devices may, however, be used for this purpose, and it is with this understanding that I refer to the container hereafter as sealed.

The sterilizing apparatus is mounted adjacent one end of a main supporting bed 28, and the cooling apparatus is mounted adjacent the other end thereof. This cooling apparatus consists of a frame 29, carrying V-shaped tracks 30, on which the carriage for the containers may roll. A track 31, may be also utilized for conveying the carriage from the sterilizing chamber to the cooling frame. When the carriage is placed on the cooling frame, the cross-arms 14, engage the clutch 32, carried by the shaft 33, mounted in suitable bearings on the main supporting frame 28. This shaft 33, is driven through suitable connections with the main shaft 8. In this position, the tray may be rotated in the carriage, while the containers are being cooled. The present apparatus is especially adapted for cooling containers made of glass, and I have, therefore, utilized in connection with the cooling apparatus, a blower 34, which is mounted on the main shaft 8, and is of the usual type. A blast of cool air may be delivered through a suitable connecting casing to a delivering nozzle 35, and from the delivering nozzle 35, against the containers in the rotating tray. It will be noted that the containers are so placed in the tray that they are rotated in planes extending longitudinally of the containers, and, therefore, the milk contained therein will be thoroughly agitated.

In carrying out my improved process, the milk to be sterilized is given a preliminary cooling to remove the animal heat, and is then placed in the containers in which it is to be stored or handled. These containers are filled within a certain percentage of the container volume. If the container is of glass, it is filled between 90% and 92% of its volume. The bottles or containers are then secured on the frame or tray 12, and the carriage is run into the sterilizing chamber. The door is closed and sealed and the main shaft operated at a slow speed of preferably 100 revolutions per minute. This rotating of the shaft will cause the bottles or containers carried on the tray or frame to rotate end over end. Steam is admitted to the sterilizing chamber through the pipe 24, the steam preferably being at about 50 pounds gage pressure. The agitation of the milk during the heating secures a uniform heating thereof. This treatment is continued at this pressure for a period of approximately five minutes, the period of time depending upon the thickness of the bottle walls, size of bottle, and character of treatment desired. Immediately at the end of this time, the steam valve is closed, shutting off the steam supply, and the exhaust valve is opened, discharging steam to the atmosphere. The door of the chamber is then quickly opened and the carriage carrying the bottles or containers is run out along the track to the cooling apparatus, where the tray or frame is again rotated. During this rotation of the tray, the fan or blower subjects the bottles or containers to a blast of air. The bottles are rotated in the blast of air for about ten minutes, after which they are cool enough to be handled and packed for shipment.

It has been found in practice that the steam pressure in the sterilizing chamber can be raised from atmospheric pressure to that indicated above very quickly when the bottles are rotated and the steam enters through a set of jets so that steam cannot impinge on any part of the bottle.

When the milk in the containers is subjected to the temperature of steam around the container, the heat at first is absorbed by the milk at a very rapid rate, which rate of heat flow is reduced as the temperature of the milk rises. The temperature of the milk would continue to rise at a decreasing rate until it finally reaches the temperature of the surrounding steam, if the containers are allowed to remain in the sterilizer a sufficient length of time. It is well known that steam at fifty pounds pressure has a temperature of approximately 147° C. As above noted, the temperature desired in sterilizing milk is approximately 130° C. In carrying out my process, the time of treatment is so gaged that the milk is allowed to reach about 130° C., at which time there is still a considerable difference between the temperature of the milk and the temperature of the steam, yet not such a great difference that the rate of temperature increase in the milk is so rapid, but that the operator is given a sufficient time margin within which to remove the milk from the sterilizer to the cooler without danger of too great variation in the temperature maximum in the milk from that desired. At a lower pressure than fifty pounds per square inch, the time of treatment required in order to reach the desired temperature in the milk would be so great that the constitution of the milk would be altered. At a greater pressure the rate of temperature change is so rapid that the operator cannot easily stop the treatment at the proper temperature. The length of the time of treatment therefore and the temperature of the steam are important items in securing the best results by my improved process, without causing the albumin in the milk to turn in color and to give a sufficient work period for the withdrawing of the container from the sterilizer. If metal bottles or cans are used, the time of treatment will be shorter, or the steam pressure varied, because of the better heat conductivity of the walls of the container, also if metal bottles are used, the same may be cooled after treatment by subjecting them to a spray of cool water in place of the air blast, as shown, in order to lower the temperature of the milk as quickly as possible.

It will be noted that by this process of treatment, the dissolved gases contained in the milk, when the same is first introduced into the bottle, cannot escape or be separated from the milk, as the pressure in the bottle during heating is substantially higher than the normal vapor pressure of the liquid, and the tendency for such gases to go out of solution is suppressed. If any such gases should be liberated, even to a slight extent, they will be again dissolved in the cooling cycle, owing to the thorough agitation.

The temperature to which the milk is to be heated, is such that the bacteria and spores are destroyed, if the milk is to be kept for any considerable period. If, however, it is intended to partially sterilize the milk—that is, where the milk is to be kept only a short time—then the maximum temperature of treatment may be such as to destroy only the bacteria. It is preferred, however, to effect complete sterilization of the milk, and the temperature to accomplish such treatment must approximate a maximum of 130° C. It has been found in practice that the milk being treated, if in glass containers, must fill such container over 85% of the full volume, in order to prevent its boiling—that is, in order to maintain a surface pressure on the milk in excess of the vapor pressure of the milk. It has been also found in practice that if the container be filled above 92%, the internal pressure is likely to burst the container. Therefore, I prefer to fill the bottle between 90% and 92% of its volume with the milk to be treated. The sealing of the bottle, after it is filled, and the sterilizing of the milk, result, as above noted, in the destroying of the bacteria and the spores without causing the separation of the gases contained in the milk from the milk, with the undesirable result of changing the taste and odor.

From the above description it will be noted that by my improved process practically all possibility of the milk becoming contaminated during handling is removed. Furthermore, during the sterilizing of the milk, the container is also thoroughly sterilized.

While I prefer the above process, wherein the pressure on the surface of the milk is obtained through the relative unequal expansion of the milk, the air over the milk, and the material of the container, it is obvious that from certain aspects of the invention, the surface pressure on the milk may be otherwise obtained. The essential features of the invention broadly consist in the heating of the milk to sterilizing temperature, and the maintaining of a surface pressure on the milk during the heating or cooling, which is in excess of the normal vapor pressure of the milk.

Having thus described my invention, I claim:

1. The process of sterilizing milk, consisting in heating the milk to sterilizing temperature, agitating the milk during heating and maintaining, during heating, a surface pressure on the milk in excess of the normal vapor pressure of the milk.

2. The process of sterilizing milk, consisting in heating the milk to approximately 130° C., agitating the milk during heating and maintaining, during heating, a surface pressure on the milk in excess of the normal vapor pressure of the milk.

3. The process of sterilizing milk, consisting in filling a container with milk to 85% to 92% of the container volume, sealing the same, heating to sterilizing temperature and agitating the milk continually during heating.

4. The process of sterilizing milk, consisting in filling a container with milk to 85% to 92% of the container volume, sealing the same, heating to approximately 130° C., agitating the milk continually during heating and subsequently cooling the same in the container.

5. The process of sterilizing milk, consisting in filling a container with milk to approximately 90% of the container volume, sealing the same, heating to approximately 130° C., and agitating the milk continually during heating.

6. The process of sterilizing milk, consisting in filling a container with milk to approximately 90% of the container volume, sealing the same, heating to approximately 130° C., and agitating the milk continually during heating, and subsequently cooling the same in the container.

7. The process of sterilizing milk, consisting in placing the same in glass containers, each of which is filled to approximately 90% of its capacity, sealing the containers, heating the containers in a sterilizing chamber under pressure to about 130° C., and quickly withdrawing from the chamber and cooling with a blast of air, said containers being rotated during heating and during cooling.

8. The process of sterilizing milk, consisting in filling a container with milk to approximately 90% of the container volume, sealing the same, introducing into a sterilizing chamber holding the container steam at approximately fifty pounds pressure, agitating the milk during heating, permitting the container to remain in the sterilizing chamber until the temperature of the milk is approximately 130° C., then quickly withdrawing the container and cooling the same.

In testimony whereof, I have hereunto signed my name at Philadelphia, Pennsylvania, this sixteenth day of December, 1912.

CHARLES E. BONINE.

Witnesses:
JAMES H. BELL,
E. L. FULLERTON.